United States Patent Office 2,783,253
Patented Feb. 26, 1957

2,783,253

CYCLOPENTANOPHENANTHRENE DERIVATIVES AND PROCESS FOR THE PRODUCTION THEREOF

Franz Sondheimer and George Rosenkranz, Mexico City, Mexico, assignors to Syntex S. A., Mexico City, Mexico, a corporation of Mexico No Drawing. Application October 6, 1954, Serial No. 460,758

Claims priority, application Mexico October 7, 1953

3 Claims. (Cl. 260—397.4)

The present invention relates to novel cyclopentanophenanthrene compounds and to a process for the production thereof. More particularly the present invention relates to the novel androgenic hormone androstan-17β-ol-3,6-dione and to novel esters thereof, to a novel process for the production of these compounds and to novel ethylene ketal intermediates. The novel products of the present invention, i. e., androstan-17β-ol-3,6-dione and its esters, are especially useful hormones of the androgen type, since they have desirable anabolic effects together with relatively minor androgenic action.

In accordance with the present invention there have been provided certain novel processes involving in part the production, as novel intermediates, of the 3,6-diethylene ketal of androstan-17β-ol-3,6-dione and also resulting in the production of androstan-17β-ol-3,6-dione compounds which may be characterized by the following formula:

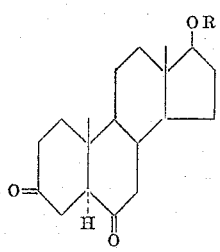

In the above formula R may represent hydrogen or R may represent an acyl group, i. e., the residue of any acid ordinarily used, as for example in the form of its anhydride, etc., for the esterification of steroid alcohols. In general these acids may be classified as carboxylic acids of less than about 10 carbon atoms, and especially hydrocarbon carboxylic acids, including carbocyclic acids such as cyclopentyl propionic, aromatic acids such as benzoic, 4-nitrobenzoic, simple aliphatic acids such as acetic, propionic and butyric and dicarboxylic acids such as succinic which forms the monoester thereof. As may be understood, the acids may be substituted as for example by nitro groups and/or halogen groups.

A process for the production of the above identified compounds according to the present invention may be exemplified by the following equation:

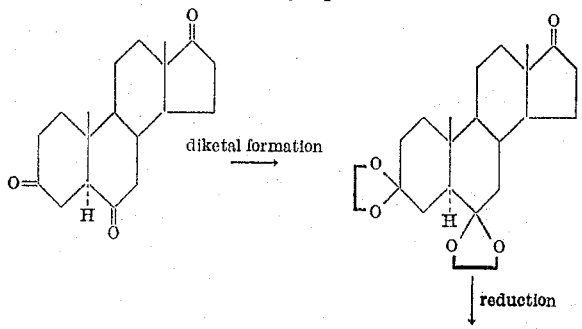

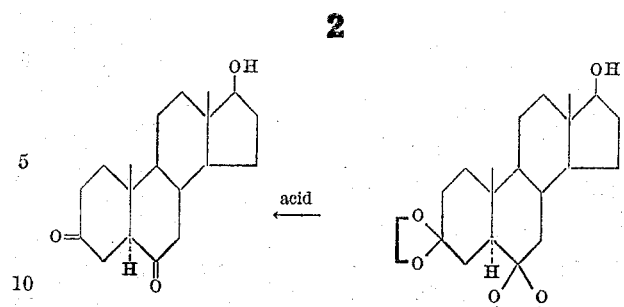

In practicing the process above outlined, the known compound androstane-3,6,17-trione was reacted in the presence of an acid catalyst such as a small amount of p-toluene sulphonic acid with a 2,2-dialkyl-1,3-dioxolane and especially with 2-methyl-2-ethyl-1,3-dioxolane. Upon refluxing for a short period of time, i. e., of the order of 30 minutes, a predominant formation of the desired 3,6-diethylene ketal of androstane-3,6,17-trione was effected by an exchange reaction. The desired diketal was then separated from the tri and mono ketal by chromatography. The free 17-keto group of the diketal thus formed was then reduced to a 17β-hydroxy group with a reducing agent such as an alkali metal borohydride, as for example sodium borohydride, or sodium metal in alcohol solution or lithium aluminum hydride to prepare the novel diethylene ketal of androstan-17β-ol-3,6-dione. This last mentioned compound as indicated above is then hydrolyzed with acid or treated with acetone in the presence of an acid catalyst to reconstitute the 3 and 6 keto groups by acid catalyzed exchange to prepare the novel androstan-17β-ol-3,6-dione. If novel esters of androstan-17β-ol-3,6-dione are desired of the types previously described, the diketal of androstan-17β-ol-3,6-dione may be treated with a corresponding acid anhydride such as for example propionic anhydride in the presence of excess pyridine since the diketal is stable to basic reagents. Treatment to reconstitute the keto groups then produces the corresponding ester of androstan-17β-ol-3,6-dione. As may be understood, the same esters may be formed by treating androstan-17β-ol-3,6-dione with acid anhydrides and pyridine or by other conventional esterification methods.

The novel androstan-17β-ol-3,6-dione of the present invention may also be prepared in accordance with the following equation:

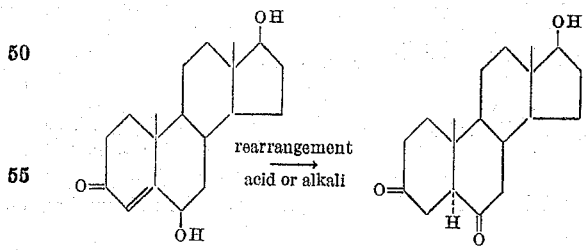

In practicing the process above outlined, 6β-hydroxytestosterone (Δ⁴-androstene-6β,17β-diol-3-one) prepared in accordance with our United States application Serial No. 406,571, filed January 27, 1954, was dissolved in a polar organic solvent such as methanol-water and treated with a strong alkali such as an alkali metal hydroxide as by refluxing for a short period of the order of 30 minutes. Thereafter the product androstan-17β-ol-3,6-dione is precipitated by pouring the reaction mixture into water and purified. The same rearrangement may be effected by similar treatment with dilute acid such as hydrochloric acid.

The novel final product of the present invention may also be prepared in accordance with the following equation:

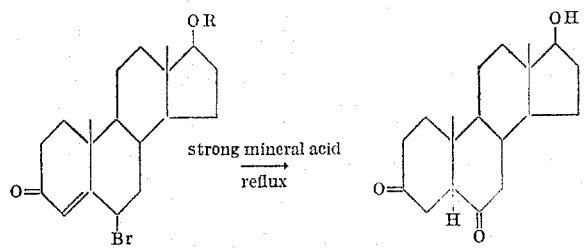

In the above equation R represents the same groups as heretofore set forth.

In practicing the process above set forth, the known 6-bromotestosterone or an ester thereof as for example the acetate, prepared as for example according to Djerassi et al., J. A. C. S. 72, 4534 (1950), is dissolved in an organic solvent, preferably a polar solvent such as a lower aliphatic alcohol containing strong mineral acid such as hydrochloric acid and refluxed for a substantial period of time, as for example about 3 hours. Upon purification the same androstan-17β-ol-3,6-dione is obtained.

The following specific examples serve to illustrate but are not intended to limit the present invention:

*Example I*

8 g. of androstan-3,6,17-trione was dissolved in 128 cc. of methyl-ethyl-dioxolane and 0.32 g. of p-toluenesulphonic acid was added. The mixture was distilled for thirty minutes to a residual volume of 25 cc. then diluted with ether and washed with a solution of sodium carbonate and with water. After evaporation to dryness the product was chromatographed in a column with washed alumina. The elution of the column with a mixture of benzene-hexane 1:1 afforded 1.45 g. of the triketal; elution with benzene gave 3.12 g. of the diketal, and the mixture benzene-ether yielded a small fraction of the monoketal. After recrystallization from acetone, the diketal had M. P. 194–196° C.

500 mg. of this diketal of androstan-3,6,17-trione was dissolved in 20 cc. of ethanol and mixed with 500 mg. of sodium borohydride and 2 cc. of water. After keeping the mixture overnight at room temperature, the excess of reducing agent was decomposed by the addition of a few drops of acetic acid, the solution was concentrated to a small volume, diluted with water and the precipitate was filtered and washed to neutral. The crude product was dissolved in 12 cc. of acetone and 50 mg. of p-toluenesulphonic acid was added to the solution which was kept overnight at room temperature. After pouring into water, the precipitate was filtered and crystallized from methanol, thus giving 220 mg. of androstan-17β-ol-3,6-dione with M. P. 231–234° C.

*Example II*

A solution of 300 mg. of 6β-hydroxytestosterone and 300 mg. of potassium hydroxide in 14 cc. of methanol and 1.5 cc. of water was refluxed for 30 minutes and poured into water. The precipitate was filtered, washed and crystallized from ether-pentane to give 210 mg. of androstan-17β-ol-3,6-dione with M. P. 233–235° C.

*Example III*

A solution of 2.5 g. of the acetate of 6-bromotestosterone in 80 cc. of methanol containing 3.2 cc. of concentrated hydrochloric acid was refluxed for 3 hours. Water was added and the product was extracted with ether. Crystallization from chloroform-hexane yielded 1.05 g. of androstan-17β-ol-3,6-dione with M. P. 235–236° C.

The products obtained in accordance with the previous three experiments proved to be identical on direct comparison.

*Example IV*

A solution of 500 mg. of androstan-17β-ol-3,6-dione prepared according to any of Examples I to III in 2 cc. of pyridine and 0.5 cc. of acetic anhydride was heated for 1 hour on a steam bath. The solution was poured into water, heated to decompose the excess of acetic anhydride and extracted with ether; the ether solution was washed to neutral, dried over sodium sulphate, concentrated to a small volume and diluted with pentane, thus yielding on cooling crystals of the acetate of androstan-17β-ol-3,6-dione.

Other esters of androstan-17β-ol-3,6-dione are prepared by reacting androstane-17β-ol-3,6-dione with acid anhydrides according to the above described acylation procedure or by conventionally utilizing the corresponding acyl halides. These esters include esters of hydrocarbon carboxylic acids of less than 10 carbon atoms derived from saturated or unsaturated, aliphatic, carbocyclic, or cycloaliphatic, aryl, arylalkyl, alkaryl, mono-, di- or polycarboxylic acids which form ester groups such as for example formyloxy, propionoxy, dimethyl-acetoxy, trimethylacetoxy, butyryloxy, valeryloxy, benzoxy, phenylacetoxy, toluoyloxy, cyclopentylformoxy, acryloxy and the esters of dicarboxylic acids such as succinic, glutaric and adipic.

We claim:

1. A process for the production of androstan-17β-ol-3,6-dione which comprises selectively forming the 3,6-diethyleneketal of androstan-3,6,17-trione, reducing the free 17-keto group of the diketal with a reducing agent to a 17β-hydroxy group to form the diethyleneketal of androstan-17β-ol-3,6-dione and subjecting this last mentioned compound to the action of a dilute acid to reconstitute the 3 and 6 keto groups.

2. The process of claim 1 wherein the reducing agent is sodium borohydride.

3. The process of claim 1 wherein the dilute acid is p-toluenesulphonic acid and the diethylene ketal of androstan-17β-ol-3,6-dione is subjected to the action thereof in acetone solution.

References Cited in the file of this patent

UNITED STATES PATENTS

| 2,692,273 | Murray | Oct. 19, 1954 |
| 2,697,715 | Eppstein | Dec. 21, 1954 |